United States Patent
Shotton et al.

(10) Patent No.: US 7,152,058 B2
(45) Date of Patent: Dec. 19, 2006

(54) APPARATUS FOR AND METHOD OF SELECTIVELY RETRIEVING INFORMATION AND ENABLING ITS SUBSEQUENT DISPLAY

(75) Inventors: Charles T. Shotton, Leesburg, VA (US); Louis P. Slothouber, Leesburg, VA (US); M. Ellen Dudar, Lovettsville, VA (US)

(73) Assignee: Biap Systems, Inc., Sterling, VA (US)

( * ) Notice: Subject to any disclaimer, the term of this patent is extended or adjusted under 35 U.S.C. 154(b) by 157 days.

(21) Appl. No.: 09/902,796

(22) Filed: Jul. 12, 2001

(65) Prior Publication Data

US 2002/0026462 A1   Feb. 28, 2002

Related U.S. Application Data

(63) Continuation-in-part of application No. 09/615,830, filed on Jul. 13, 2000.

(51) Int. Cl.
*G06F 17/30* (2006.01)

(52) U.S. Cl. .......................................... 707/3; 719/317

(58) Field of Classification Search .................. 707/4, 707/101, 102, 203, 3; 709/246; 719/317
See application file for complete search history.

(56) References Cited

U.S. PATENT DOCUMENTS

| | | | |
|---|---|---|---|
| 5,416,917 A * | 5/1995 | Adair et al. ................. | 707/203 |
| 5,587,902 A | 12/1996 | Kugimiya | |
| 5,649,186 A | 7/1997 | Ferguson | |
| 5,710,918 A | 1/1998 | Lagarde et al. | |
| 5,721,908 A | 2/1998 | Lagarde et al. | |
| 5,727,159 A * | 3/1998 | Kikinis ........................ | 709/246 |
| 5,768,528 A | 6/1998 | Stumm | |
| 5,822,258 A | 10/1998 | Casper | |
| 5,864,863 A | 1/1999 | Burrows | |
| 5,963,937 A * | 10/1999 | Yamasaki et al. ............... | 707/4 |
| 5,974,441 A | 10/1999 | Rogers et al. | |
| 5,983,267 A | 11/1999 | Shklar et al. | |
| 5,987,403 A | 11/1999 | Sugimura | |
| 5,996,000 A | 11/1999 | Shuster | |
| 6,012,083 A | 1/2000 | Savitzky et al. | |
| 6,023,697 A | 2/2000 | Bates et al. | |
| 6,052,688 A * | 4/2000 | Thorsen ....................... | 707/100 |

(Continued)

FOREIGN PATENT DOCUMENTS

EP     0774722     0/0000

OTHER PUBLICATIONS

Fred Douglis, "Tracking and Viewing Changes on the Web", 1996 USENIX Technical Conference, AT & T Bell Laboratories.*

(Continued)

*Primary Examiner*—Jeffrey Gaffin
*Assistant Examiner*—Nguyen CamLinh
(74) *Attorney, Agent, or Firm*—Hunton & William, LLP

(57) ABSTRACT

A system for reliably retrieving information which may be in any one of several possible formats and for subsequent display of that information in any one of several possible formats. User-defined agents are used to retrieve target data based on a heuristic algorithm and to store the target data in a canonical form, ready for republication in whatever form best suits a particular application. The system is particularly well suited to obtaining information over the internet for display on a desktop system, but it is also well suited for applications having only limited display or computational capabilities.

28 Claims, 12 Drawing Sheets

U.S. PATENT DOCUMENTS

| | | | |
|---|---|---|---|
| 6,067,559 | A | 5/2000 | Allard et al. |
| 6,070,185 | A | 5/2000 | Anupam et al. |
| 6,085,186 | A | 7/2000 | Christianson et al. |
| 6,085,193 | A | 7/2000 | Malkin et al. |
| 6,088,731 | A | 7/2000 | Kiraly et al. |
| 6,092,099 | A | 7/2000 | Irie et al. |
| 6,108,686 | A | 8/2000 | Williams, Jr. |
| 6,199,097 | B1 | 3/2001 | Hachiya et al. |
| 6,205,456 | B1 | 3/2001 | Nakao |
| 6,339,775 | B1 * | 1/2002 | Zamanian et al. .......... 707/101 |
| 6,567,816 | B1 * | 5/2003 | Desai et al. ................ 707/102 |

OTHER PUBLICATIONS

Richard Stevens, "Unix Network Programming", 1990 by P T R Prentice Hall, Inc., pp. 72-85.*

Ashish, N., et al.; "Semi-automatic Wrapper Generation for Internet Information Sources"; Cooperative Information Systems, 160-169; (1997).

Liu, Ling, et al., "XWRAP: An XML-enabled Wrapper Construction System for Web Information Sources"; Data Engineering, Proceedings, 16th International Conference on San Diego, CA, vol. 29, pp. 611-621 (2000).

Hsieh-Chang, T., et al.; "An Architecture and Category Knowledge for Intelligent Information Retrieval Agents", System Sciences, pp. 405-413, (1998).

Kent, C., et al., "Creating a web analysis and visualization environment", Computerr Networks and ISDN Systems, pp. 109-117, vol. 28, No. 1, (1995).

Declaration of Charles T. Shotton, Jr., Civ. Action No. 00 906 1, E. D. Va., filed Jun. 1, 2001.

* cited by examiner

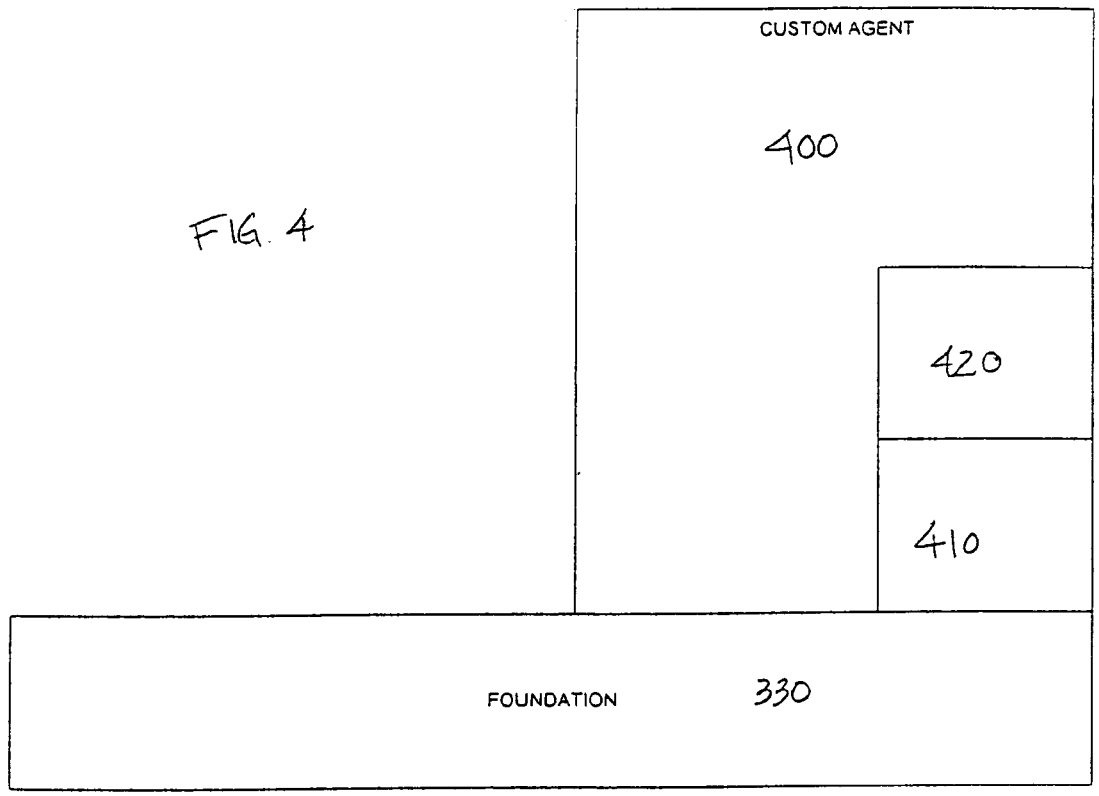

APPARATUS FOR AND METHOD OF SELECTIVELY RETRIEVING INFORMATION AND ENABLING ITS SUBSEQUENT DISPLAY

RELATED APPLICATIONS

This application is a continuation-in-part of U.S. patent application Ser. No. 09/615,830, filed Jul. 13, 2000, the specification of which is hereby incorporated by reference.

FIELD OF THE INVENTION

The present invention relates generally to the selective retrieval and display of data. More particularly, it relates to selective retrieval of data from original data in any one of a number of possible formats, with subsequent presentation of the retrieved data in any one of a number of possible formats in accordance with a user need or preference.

BACKGROUND OF THE INVENTION

The internet makes incomprehensibly large amounts of information available for retrieval and review. This information is typically made available as the content of various web pages. Search engines such as Google™ now search well in excess of one billion web pages in response to queries input by users. While these search engines are generally satisfactory for their intended purpose, they do require the user to formulate and input a search query every time the user has to locate and retrieve information. This need is obviated in some instances by certain automatic processes for retrieving data, variously called "agents" or "spiders" or "bots." These processes, however, at least in their current implementations have drawbacks. For example, the information on web pages available on the internet vary widely in terms of native format. These automated processes may encounter difficulties in reliably retrieving data from these resources.

The number of devices which can be used to access and display this information is also increasing dramatically. PCs, enterprise servers, PDAs, web-enabled phones, cable TV set top boxes, and home gateway systems are just some of the devices which now can be used to access information on the internet. Again, these devices may vary widely in terms of the format in which data must be in order to be displayed properly. Also, some of these devices are quite limited in terms of computational power and memory and they may use a variety of operating systems.

There is thus a need for a system which can reliably retrieve data originally in any one of a number of formats, and which can subsequently display that data in any one of a number of possible formats. At the same time, it is desirable that the system be compact and capable of operating under any one of a number of possible operating systems and environments.

SUMMARY OF THE INVENTION

The present invention meets these needs through the provision of a system which is capable of retrieving data originally in any one of a variety of formats and re-presenting that data in any one of a number of formats. For example, if the data is originally in a web page, to be accessed using a PC over the internet, predefined agents are used to identify the data using a predetermined technique and additional agents are used to format the data for presentation along with data retrieved by using other agents as part of a user-defined page view.

BRIEF DESCRIPTION OF THE DRAWINGS

FIG. 4 is a graphical depiction of a presently preferred architecture of a custom agent according to the present invention;

FIG. 8 is a flow chart showing a presently preferred overall method according to the present invention of identifying target content;

DESCRIPTION OF THE PREFERRED EMBODIMENTS

One aspect of the present invention as a system for gathering data, or content, from the internet, and for republishing that data, where the gathering is not linked to the republishing. The system does not need to have any a priori information on the format of the data it will need to gather, or on the format (or formats) in which that data will ultimately need to be republished. Instead, the system has the capability of reformatting any one of a number of possible formats it may encounter on the gathering process into a canonical format, and of subsequently translating the canonical format into any of a variety of formats for republishing. In one presently preferred embodiment, the functions of gathering, storing, and republishing are all accomplished on a local computer. In other embodiments, such as cable set-top boxes and web-enabled phones, these functions may be distributed between a server-type device and the local computer device.

Figure 1:
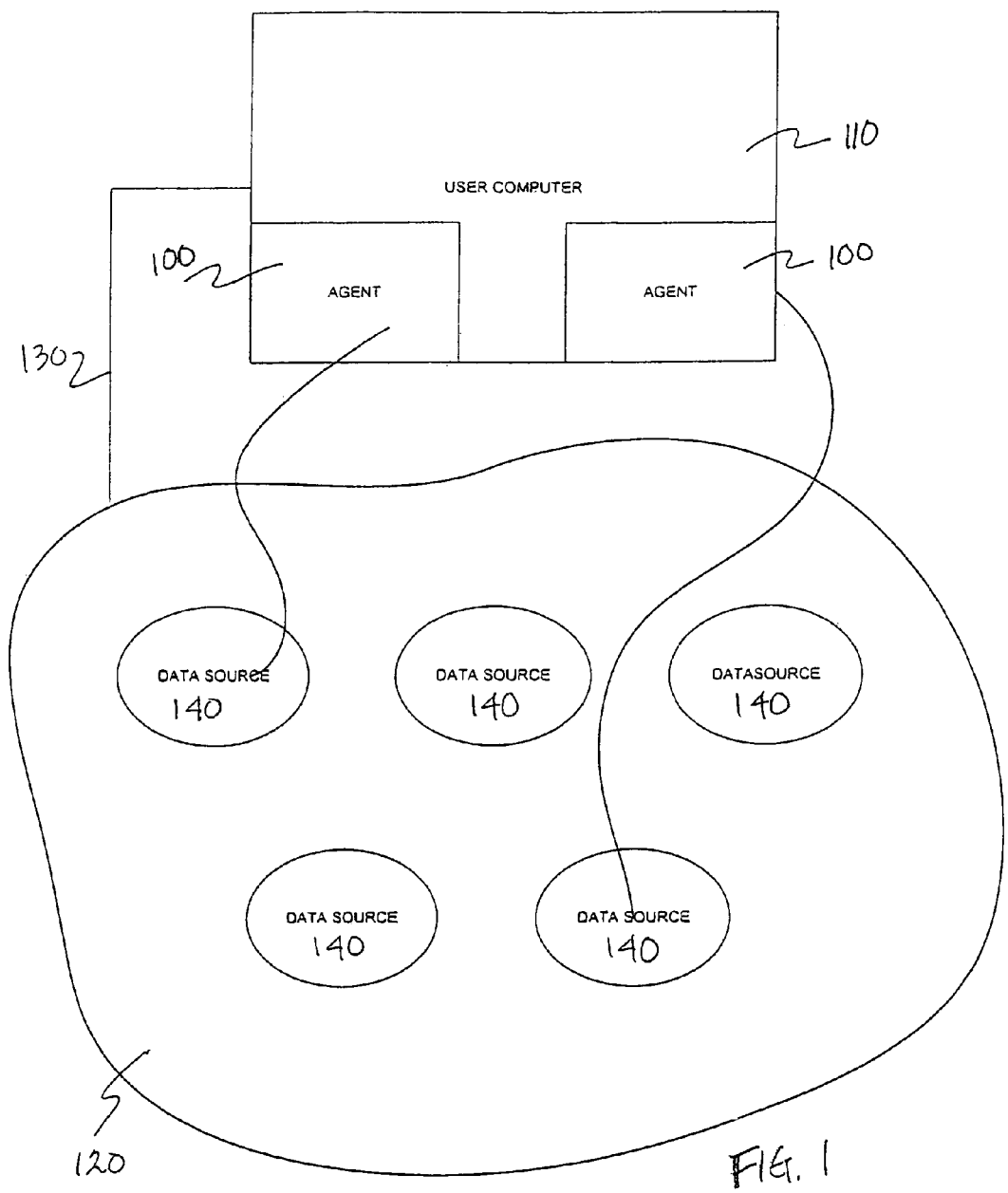
FIG. 1 is a diagram showing the relationship between a local user of an agent according to the present invention and a network of data sources.

Referring now to the drawings, in which like reference numerals are used to refer to the same or similar elements, FIG. 1 shows the environment in which a system according to the invention may operate. A user's local computer 110 has one or more software "agents" 100 loaded and active on it. The local computer 110 may be an Apple MAC, an IBM-PC type, one using UNIX or LINUX operating systems, personal digital assistant ("PDA"), or a web-enabled telephone, a cable set-top box, or another computer device capable of accepting user input, accessing the internet, and displaying graphical or text content to one or more users. The local computer 110 is connected to a computer network 120, such as the internet, via any known connection 130, including local area network (LAN) dial-up telephone, digital subscriber line (DSL), T1 lines, a cable modem, or various wireless connections, among others.

The computer network 120 includes multiple data sources 140. Some or all of the data sources 140 may be web pages, which can be accessed using the agent 100 and contain desired information content, sometimes referred to herein as target content. The possible forms for the target source are not limited to traditional web pages, and may include HTML documents, XML documents, text files, graphic files, mail messages, database files and other similar types of computer files. Each agent 100 includes a link to a single data source 140. The data sources 140 could be accessed by a conventional web browser and the information content is in a format readable by the conventional web browser.

The agent 100 may reside entirely on the user's computer 110 and, when activated, is used to download, for example, the target web page located at a specified URL of the data sources 140. Many agents 100 can be active on a single user's computer to retrieve target content from many different target web pages.

A system according to the present invention is particularly advantageous since it may reside and execute solely on a local computer where the user of the agent software and/or data is located. Execution of agent routines on other computers is not required for the agent to function; the agent software requires only access to the information stored on remote computers to perform its functions. The agent can be used to create a personal internet portal for a individual user by retrieving, formatting and storing content from one or more specific remote locations. The stored content can then be put into a personal publication presenting the content from many different remote locations on a single, local page.

Figure 2:
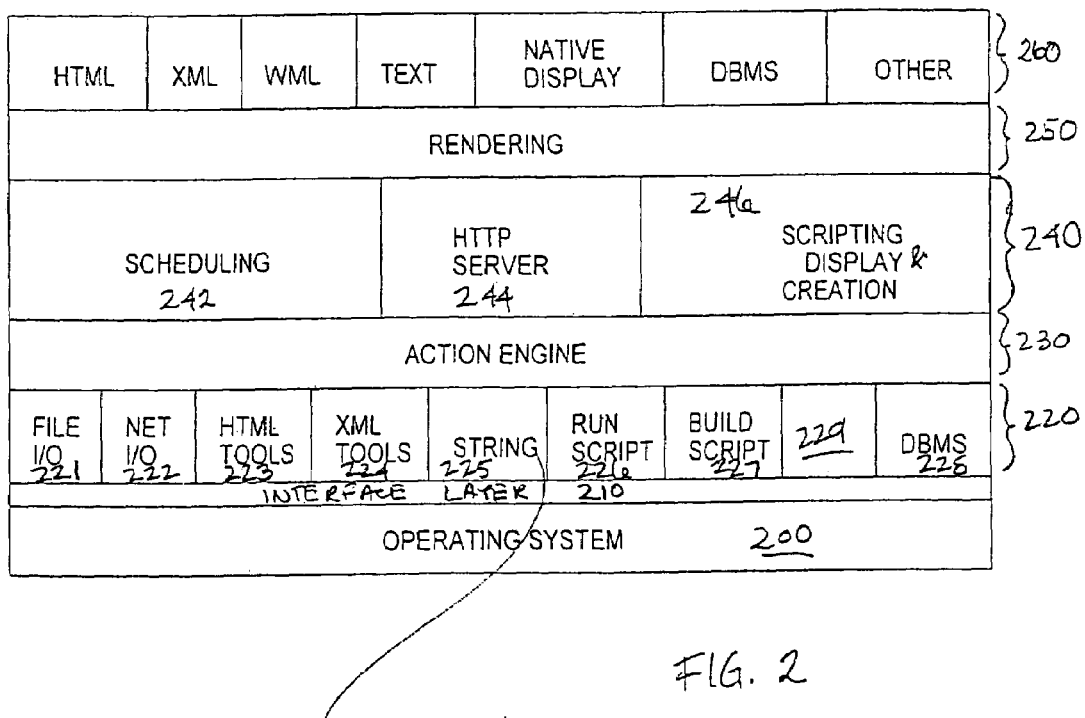
FIG. 2 is a diagram showing a presently preferred architecture of programming for implementing the subject invention.

The invention may be implemented on a suitably programmed computing device. In such a context, the programming preferably has a stacked or layered architecture. In other words, the application's design is preferably partitioned into distinct layers of functionality. One such implementation is shown in FIG. 2. At the base of the architecture is the operating system 200. The application is designed to be capable of working with any one of several types of operating systems, i.e., to be operating system independent, so the operating system may be any conventional operating system such as Macintosh®, Windows 32®, Linux, Solaris, Posix 1.1, etc.

The next layer in the application architecture is preferably an interface layer or "glue" layer 210 which interfaces with the operating system. The interface layer 210 translates commands from the operating system 200 into commands for higher-level functions. Similarly, in the opposite direction, the interface layer 210 translates commands from the higher level functions into operating system commands. This permits the application to sit without modification on top of any type of operating system providing the proper interface is in place.

Module layer 220 includes modules for basic functions such as a File I/O module 221, a Network I/O module 222, HTML tools module 223, XML tools module 224, a String Manipulation module 225, a Run Script module 226, a Build Script module 227, or a Database Management (DBMS) module 228. The blank box 229 is intended to indicate that this list of possible modules is not exhaustive, and that it is contemplated that different or additional modules might be included depending on the requirements of a given application.

The action engine layer 230 provides for the interoperability and extensibility of the modules in layer module 220 by providing a standard interface that hides the implementation details of those modules from each other and from other layers of the application. Modules in layer module 220 can be implemented within the application program, or as scripts in the application's scripting language, or as distinct plug-in modules that are merged into the application dynamically.

Layer 240 comprises modules for higher level administrative functions such as a Task Scheduling module 242, an HTTP server module 244, a Scripting and Display Creation module 246, and so on.

It is another goal of the invention that the application be "display agnostic", that is, that it be capable of displaying the information it has gathered in whatever format the user needs or desires. To achieve this end, a rendering layer 250 is provided which is capable of rendering data coming from the upper module layer in any one of a number of conventional formats such at HTML, XML, text, WML, DBMS, or other format. The rendered data is in turn handed off to a module in the display module layer 260 for final processing before display.

The operation of a system such as that depicted in FIG. 2 can be regarded functionally as the operation of various agents, defined by the user or another, which perform or which can be used to perform certain designated functions. The agent may consist simply of data to be used by another program to implement the agent function (e.g., data retrieval or display), or of executable programming instructions, or of a combination of data and programming instructions.

Figure 3:
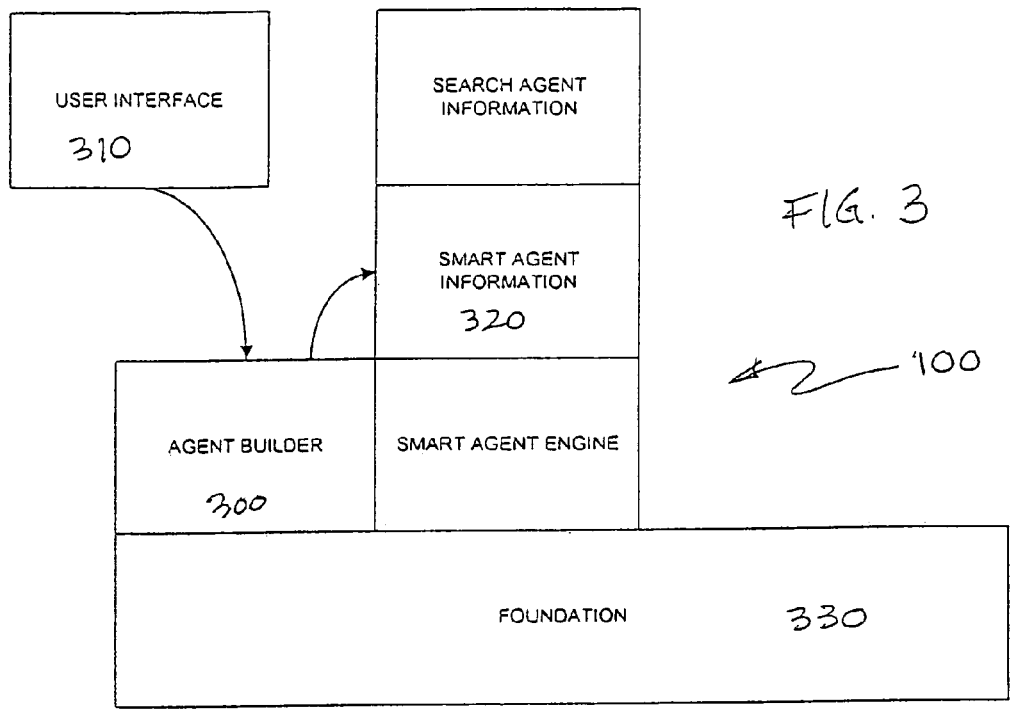
FIG. 3 is a graphical depiction of a presently preferred architecture of a software agent of the invention.
Figure 5:
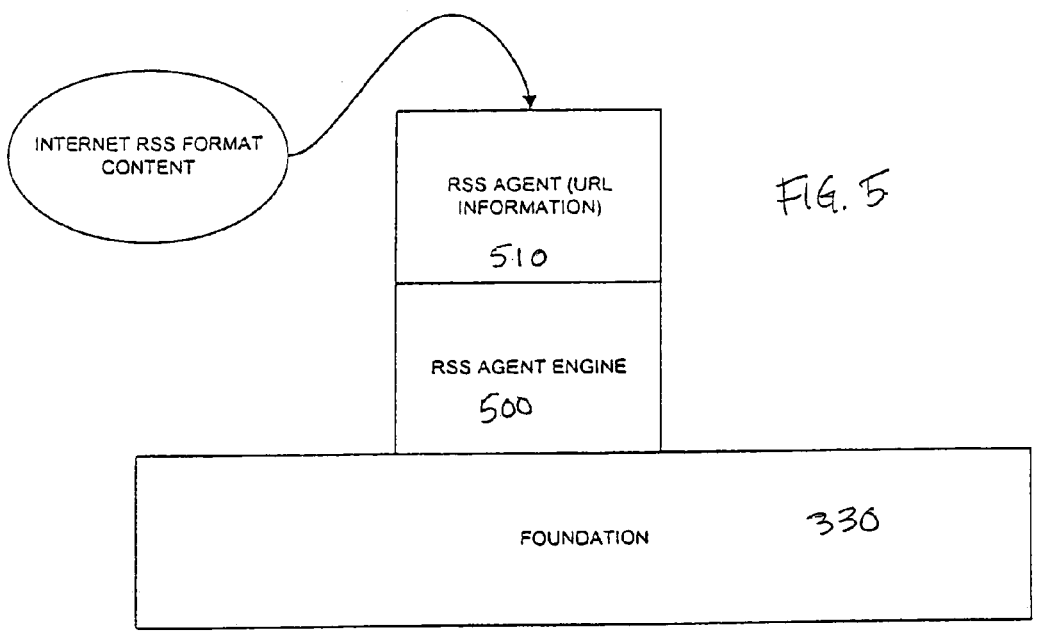
FIG. 5 is a graphical depiction of a presently preferred architecture of an RSS-type agent according to the present invention.

FIGS. 3, 4, and 5 illustrate the structure of three primary types of the software agent 100.

FIG. 3 shows the general architecture of an agent 100 which can ultimately be one of two related types: a smart agent or a search agent. FIG. 3 illustrates the specificity of the different parts of the agent 100 with general programming at the bottom and specific instructions at the top of the diagram.

Instructions which distinguish the current agent 100 from other agents are input to an agent builder program 300 using the user interface 310 of computer 110. The agent builder program 300 converts the input instructions into smart agent information 320. The smart agent information 320 is essentially data with parameters that can be used by the other agent software modules.

All agents 100 include a foundation 330. The foundation 330 includes various agent tool and library routines used by the agent 100 to perform its functions. Tools and library routines may include, for example, a function which requests and retrieves a target web site from a URL specified by the smart agent information 320, checking algorithms for verifying the accuracy of an agent, and other common programming routines that can be combined to implement larger program functions. This foundation 330 corresponds functionally to layer 220 of FIG. 2. The foundation 330 further includes communications protocols and HTML and RSS parsing routines, as described in more detail below.

The smart agent engine 340 uses the foundation 330 elements to produce program instructions for the agent 100 based on the smart agent information 320. The smart agent engine 340 includes a predefined process for applying the tools and library routines to the problem presented by the smart agent information 320. A smart agent is the basic agent of the agent software. It corresponds generally to the action engine layer 230 of FIG. 2.

A search agent includes the search agent information 350. The search agent information 350 adds a placeholder to the smart agent information 320 for entering search terms or other information, such as a username/password combination. The search agent may be used to retrieve search results from a known remote site (the target web site) offering indexed, searchable information, among other things. The search agent information 350 causes additional instructions to be added to the program created by the smart agent engine 340.

A custom agent module 200, as shown in FIG. 4, interacts directly with and is built on the foundation 330. The custom agent module 400 includes an engine 410 for building and operating a program process using the elements of the foundation 330. Custom agent information 220 is used to generate the agent 100 data and/or programming. Custom agent modules 200 incorporate specialized functions which cannot be enabled using the basic smart agent engine 340.

An RSS-type agent 100 is shown in FIG. 5. Some sites on the internet contain information in a format known as RSS, which is a specific structured form of XML. The RSS format is very specific and all data in RSS format always has the same structure. Another similar format is known as RDF.

An RSS-type agent is a simplified version of the smart agent of FIG. 3 described above. The RSS-type agent 100 can be used to retrieve any content which is stored in a predetermined, known structure, like RSS or RDF.

The RSS type agent 100 includes the foundation 330 as does a smart agent, but the RSS agent engine 500 and RSS agent information 510 are simplified. The RSS agent information 510 consists simply of the URL location of the desired RSS format data to be retrieved. The RSS agent engine 500 contains program instructions designed to specifically retrieve and store content in RSS format that is modified only by the URL location in the RSS agent information 510.

Figure 6:
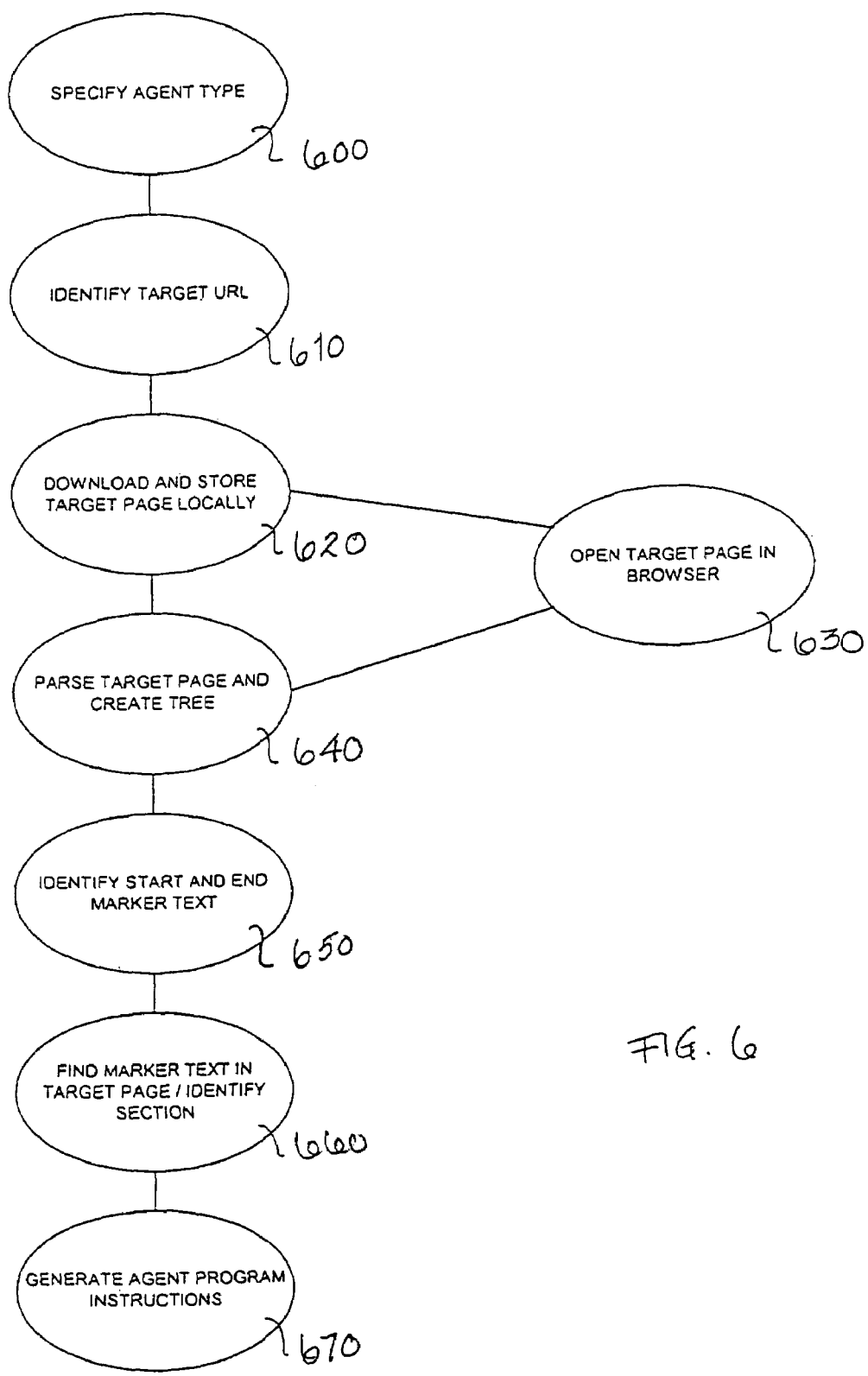
FIG. 6 is a flow chart of a presently preferred process for creating an agent according to the present invention.

The steps for creating an agent 100 to retrieve information content in an example where the target is a web site are displayed in the flow chart of FIG. 6. In a first step 600, in an application window on the user interface 310, the agent type is specified, for example, as a basic smart agent, a search agent, a custom agent or an RSS agent. In a next step 610, the URL of the target page of the web site is identified 210 for the agent 100 using the user interface 310 and agent builder 300. In a next step 620, text and HTML in the target page are then downloaded and stored in their entirety on the local machine.

Once the target URL is identified, optionally, the content of the target web page can be displayed in a step 630 with the user interface 310 in a browser window for reference.

Returning to the main flow of the procedure, in a next step 640 the target page is then parsed 217 by the agent builder 115 to determine the structure of the target page. The syntax and structure are analyzed and decomposed by the agent builder 300 and a parse tree is constructed. The parse tree represents all of the major structural elements found in the target web page, using well-known semantics associated with HTML syntax. The hierarchy of the original target page is determined, along with nodes that correspond to each structural element found in the target document. Plain text, links, image references and all other web page components are related to the HTML syntax elements enclosing them in the target page definition and placed into the parse tree structure as elements of the tree. It should be noted that images and non-text elements are preferably not downloaded since they are result of separate HTTP (Hypertext Transmission Protocol) transactions different from the one required to retrieve the target web page.

In all cases, the original HTML formatting information, structural information and content from the target page are maintained in a form that allows the original version of the target page to be recreated in a functionally equivalent form.

Next, in the step designated 650, for smart, search and custom agents, the target content of the web page is selected by a user and identified for the agent in two steps. The user selects a unique text at the beginning of the target content and identifies the text for the agent 100. This text is referred to as the start marker text for the target content. Then, a second unique text near the end of the target content is selected and identified for the agent 100. This text is referred to as the end marker text.

The start and end marker text identify a section of the target web page containing content that is desired by a user. The actual text content found in that structure may change periodically; the marker texts are only used to identify the structure within the target page where the target content is initially located on the web site.

Identification of the start and end marker text in the target content can occur in at least three ways. The user can identify the text by manually entering the marker text into an agent builder application window on the user interface 310, the user can cut and paste text from the target web page into the agent builder 300, or the user can select the text in the browser window displaying the target web page and direct the agent builder 300 to retrieve the selected text and use that for the input for the identification.

Start and end marker text may consist of plain text, stylized text, HTML syntax elements such as tags or comments, or any other text-based information contained in the target web page.

In all cases, the start and end marker text is used to identify an approximate, human readable location in the precise structure of the target web page that the agent builder 300 can use as a starting point to determine the actual physical location of the target content within the web page structure and syntax. The human readable and identifiable location may consist of a single block of content from the target page delineating the entire area of interest, or, it may consist of discontinuous areas of text to be considered the start and end markers for the area of interest.

The unique text used for the start and end marker text does not need to be precisely at the beginning or the end of the content. The agent builder 300 contains an algorithm for checking the identified text in the target page against the marker text and to determine which section or sections of the target web page are intended to be selected.

The marker text is distilled into a case-insensitive version of the text identified by the user, with all unnecessary white space and intermediate formatting removed. In the next step, designated 660, the agent builder 300 then searches the parse tree for a sequence of text-based content that matches the marker text. The marker text can span multiple nodes the parse tree and be physically separated by intervening HTML formatting tags. The agent builder 300 can reassemble the linear stream of content-oriented information from the raw HTML information using the structural information in the parse tree. The content stream is compared to the distilled marker text to ensure that the correct structure has been located.

As an example of the parsing, assume the following represents the structure of a simple HTML document:

```
<html>
    <head><title>This is a test</title></head>
    <body>
    <table>
        <tr>
            <td>Tuesday, March 21, 2000</td>
            <td>Headlines: New software builds agents!</td>
        </tr>
        <tr>
            <td><img src ="something.gif"></td>
            <td>A picture of something</td>
    </table>
    </body>
</html>
```

Figure 7:
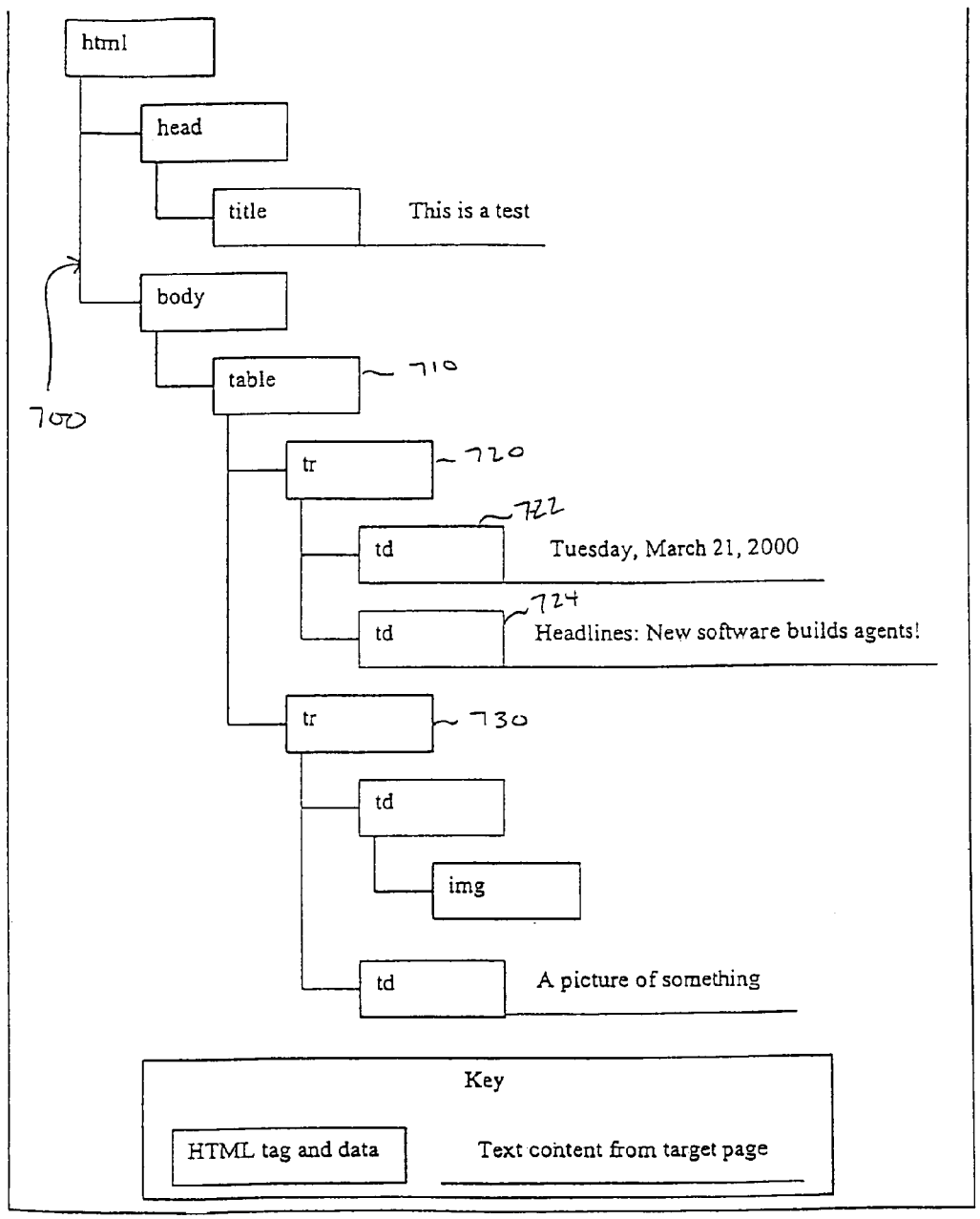
FIG. 7 is a representation of a parse tree created by an agent according to the present invention to describe a target page.
Figure 6:
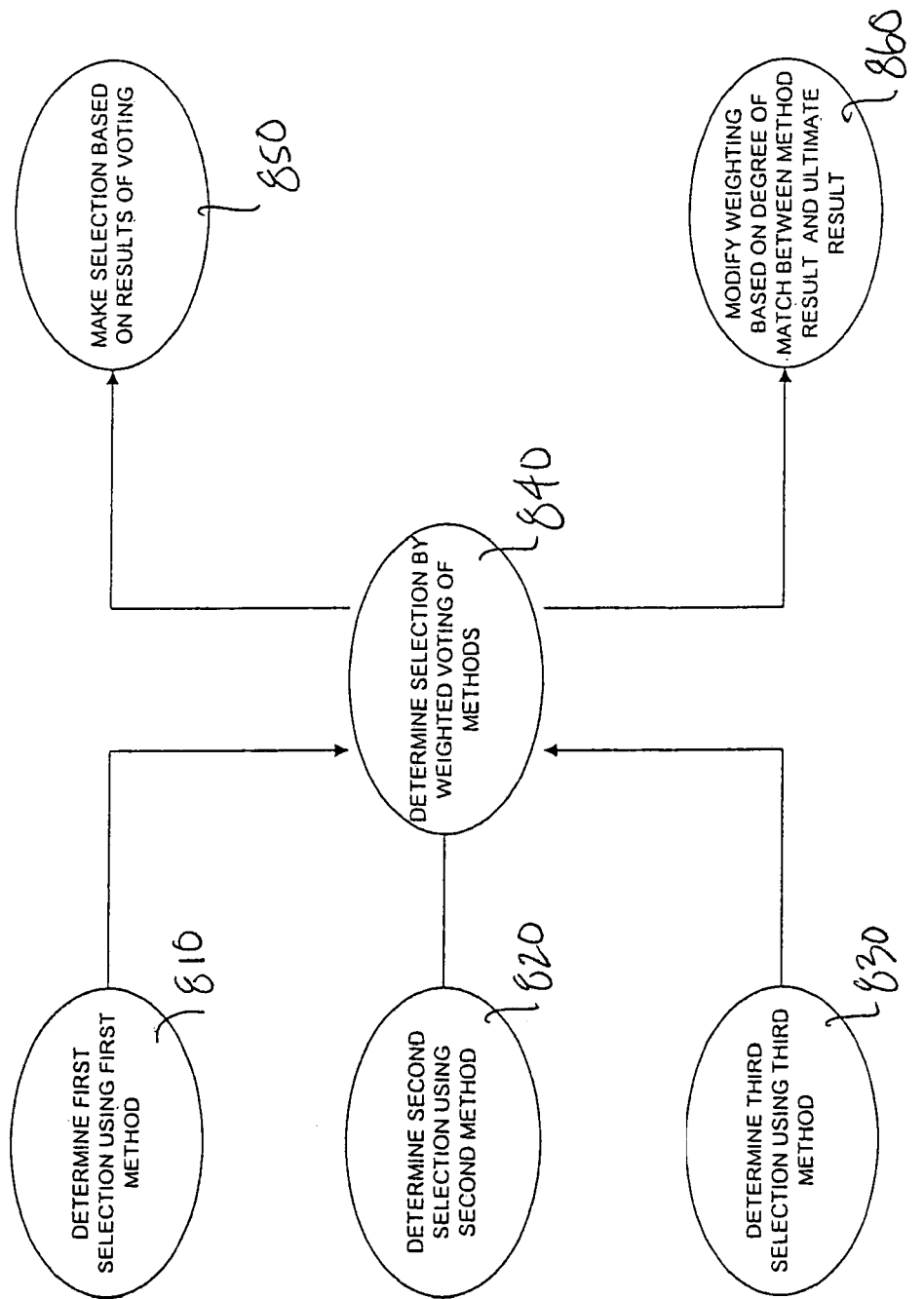

FIG. 7 illustrates what the resulting parse tree 700 of this structure may look like. Thus, if the user specified start marker text to be "Tuesday" and the end marker text as "Headlines", the agent builder 300 will determine location of the structures having this text in the parse tree 700. The agent builder 300 will find that the start marker text is contained in the first table 710, first row 720, first cell 722 and the end marker text is in the first table 710, first row 720, second cell 724. The agent builder 300 then determines that to construct the agent 10 for extracting a useful, syntactically correct fragment of HTML from the target page that it must extract the contents of both cells 722, 724 in the first row 720. The agent builder 300 will also extract the surrounding HTML formatting and elements to make the extracted content into a complete, stand-alone HTML entity. Thus the resulting extracted content will be a stand-alone HTML table having the following structure:

```
<table>
    <tr>
        <td>Tuesday, March 21, 2000</td>
        <td>Headlines: New software builds agents!</td>
    </tr>
</table>
```

The second table row is excluded from the target content since even though it was a part of the same table, or parent object, it was outside the target object—the first row.

Once the marker text is found in the target page, the structural location within the parse tree is stored. This is done for both the start and end marker text.

If the agent 100 is an RSS agent, then the start and end marker text is not necessary, because the RSS content at the target URL is intended to be taken in its entirety. The RSS content corresponds to the entire desired content and so it is not in a section of a target web page that must be identified like other non-RSS content may be. Thus, steps 650 and 660 may be skipped for RSS agents.

Returning to FIG. 6, when the start and end marker text locations have been identified in the parse tree, the agent builder 300 proceeds in a next step 670 to automatically generate the structural and statistical information, i.e., the agent data that are needed later to carry out the strategies for identifying content described below. It is thus clear that the agent builder 300 software generates an agent which can be used in identifying a structure containing the potentially changing target content on a fixed target URL.

The agent builder 300 moves back and forth through the parse tree hierarchy to determine a common structural element containing all of the start and end marker text. Then, data are generated which are used to identify the same location in future, changed versions of the target page. This feature permits the agent to be used to repeatedly and accurately retrieve changing content from the same location of a target page. These data are later used with program instructions for automating the download, analysis and extraction steps of the agent execution process (explained below) using the foundation 330 elements. The resulting agent 100 is stored for future use.

As noted, one role of an agent is to retrieve data from a resource which was specified at the time the agent was created. The function of grabbing data is accomplished by identifying where the desired data is likely to exist within the structure of a resource and then retrieving it. One relatively straightforward way of accomplishing this is through string matching or pattern matching. In this method, it is assumed the data to be retrieved is always immediately preceded by a first given character string and is always immediately followed by a second given character string, or that the data to be retrieved always matches a pre-determined pattern. If this assumption is valid, then retrieving the desired data is simply a matter of finding matching strings or patterns and retrieving the data between them.

Unfortunately, there is usually too much variation in the desired data and the character strings bracketing the desired data to permit string or pattern matching by itself to work reliably. Therefore in the present invention it is preferred to use a combination of strategies to effect reliable retrieval. More specifically, in the present invention, it is preferred to use several strategies in tandem. Each strategy identifies a certain segment of data to be retrieved as a result. The application then aggregates the various results to determine a consensus result which most likely contains the targeted data.

In a presently preferred embodiment, the system aggregates the results by having each strategy "vote" on a result and by weighing the vote according to how successful the method voting on the result has been in previous determinations. In other words, if a given method has been successful in the sense that the result (in the form of identification of the location of the target data) it generated individually matches the ultimate consensus result, then its result is assigned more weight in future voting. Conversely, if a given method has not been successful in the sense that the result it generated individually did not match the ultimate consensus result, then its result is assigned less weight in future voting. In this way, methods which have proven to be more likely correct are given more weight in the voting while sources which have not proven quite as reliable are given less weight. This improves the overall performance of the procedure, while allowing the system to adapt to different data types where one method may be more effective than another.

The preferred strategy is therefore to define a suite of techniques and combine their results. This is illustrated in FIG. 8. First, in steps 810, 820, and 830, the location of the desired content on the parse tree is determined by several different methods. The figure shows the use of three methods, but it will be apparent to one of ordinary skill in the art that this number is arbitrary and that more could be used. Also, these steps may be carried out simultaneously or seriatim.

Once the various methods have made their determinations, an ultimate "winner" is determined in step 840 by weighted voting. Each method has assigned to it a particular weighting based on how well its result has corresponded with the winner in the past. The system in step 850 then makes a selection based on the outcome of the voting. At the same or a later time, in step 860, the system adjusts the weighting based on the most recent voting.

One technique may be simple string matching as described above where the system looks for predefined starting and ending strings. A second possibility is to examine the absolute positions and lengths of candidate content for retrieval. A third possible strategy is to search for matching context around the desired data. A fourth strategy is to employ more complex pattern matching techniques such as fuzzy expert system and neural networks to identify the desired data. It will be readily apparent to one having ordinary skill in the art that any of a number of individual methods can be used. But regardless of the individual methods chosen, it is the ability to combine results to form a weighted consensus, and to dynamically adapt that weighting to changes in the desired data over time, that contribute to the overall effectiveness of the strategy.

Figure 9:
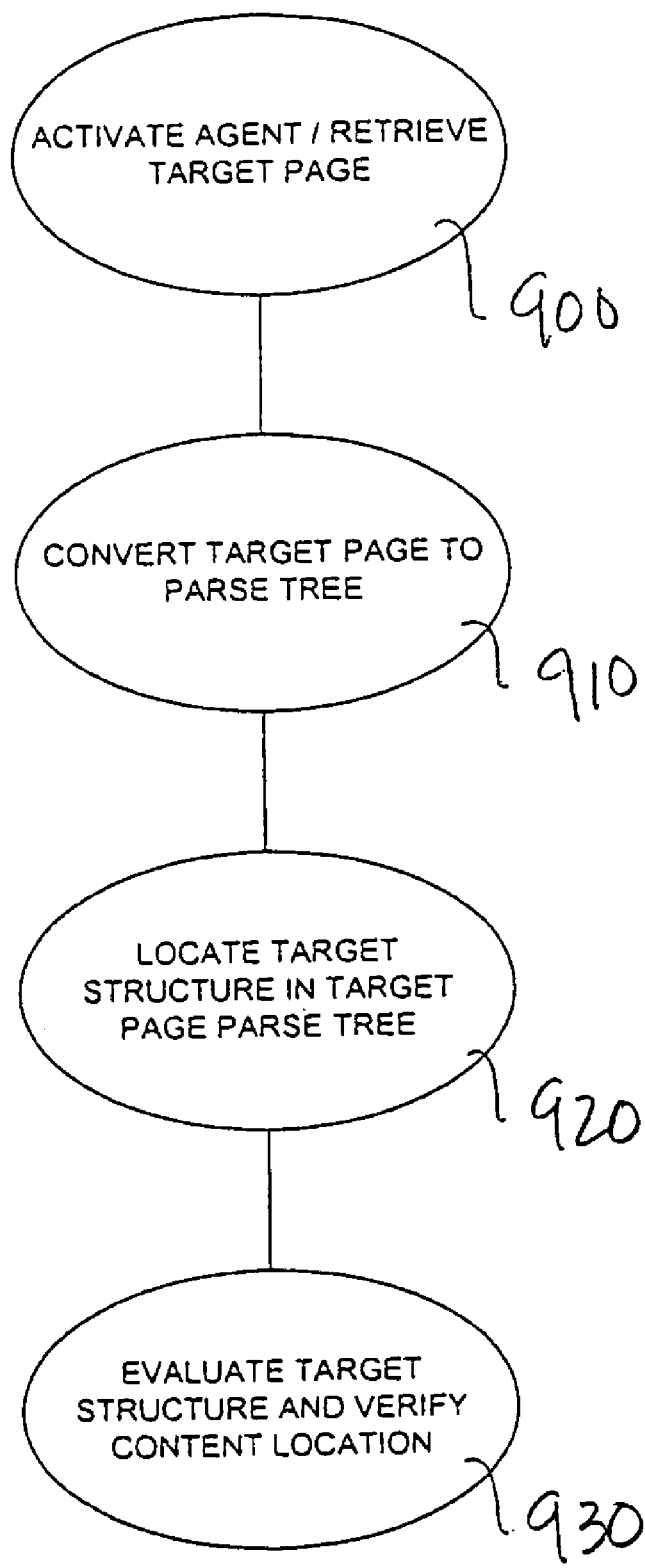
FIG. 9 is a flow chart showing operation of one method of identifying candidate target content which could be used as part of the method of FIG. 8.

To give an example of a specific method, as shown in FIG. 9, first the agent 100 is activated in a step 900, such as by a scheduling application or manually by a user, and the target page at the URL stored in the agent information 120 is retrieved. The current version of the target web page is downloaded into the memory of the local computer 110 by the agent 100. The target web page is then analyzed and converted into a parse tree representation in a step 910.

In next steps 920 and 930, the agent data and statistics generated by the agent creation are used to locate the structural location in the parse tree where the target content was originally found, without regard to the current content at the structural location in the current version of the web page. The target content is then used as one of the candidates which will be voted on in the overall method.

Other roles of agents may include, but are not limited to, querying corporate databases, accessing desktop applications, retrieving data from e-mail messages, or interacting with any information source or device that is accessible via the internet/intranet. It will be readily apparent to one having skill in the art, however, that other agent-based operations can be carried out.

When the target content is identified in the structure of a retrieved page, the content text is extracted and HTML content is regenerated around the content text based on the structure surrounding the content text in the current version of the retrieved page. The structure of the original target document that was used to create the agent 100 is relevant only to the evaluation step insofar as the original structure was used to generate the program instructions used by the agent to retrieve and evaluate the current version of the target page.

If the structural location cannot be found or has changed from the originally programmed agent information, the agent 100 can evaluate the parse tree to attempt to determine the current location of the target content. The evaluation of a retrieved target page is based on a series of rules derived from the standard syntax of HTML documents. The target content area is by definition contained within some set of hierarchical HTML tags, provided that it has not been eliminated entirely from the target page. The software agent 100 embodies knowledge of these tags, their relationships, and proper syntax and semantics. The agent 100 may also include algorithms using this knowledge to determine where the target content structure has been moved to within the target page, or it may simply be data operated on by such algorithms.

Once the target data is determined, it is necessary to retrieve it and store it in a form which can be used to present the data. It is presently preferred to store the data in a canonical form in a local or remote object database (ODB). A presently preferred structure for the canonical form is as a "collection" which may include a title for the collection, the date the collection was created, and a URL associated with the collection. The collection will also include content in the form of multiple items, one or more of which might be displayed. Once target data has been retrieved, it is translated into the canonical form. The canonical form is used as the basis for presentation of the data in the desired format or mode.

For example, the collection may have the following format:

```
                    COLLECTION
                       DATE
                       TITLE
                       URL
                       IMAGE
                       ITEMS
                          ITEM 1
                             TITLE
                             URL
                             BODY
                          ITEM 2
                             TITLE
                             URL
                             BODY
```

Agents are thus used to go out on the internet, or an intranet, to a local or remote database, to applications and data on the local machine, or wherever they have been defined as a means to seek data. The data from these disparate sources is then stored in an object database (ODB) in a canonical form in real time.

Data which the application uses in determining how to operate also resides in an ODB. The ODB may be local or remote. The data stored in the ODB are the results of a user's specification of agents as well as user preferences. The data includes information on structure and organization of display templates, user specification of the preferred look and feel of displays, and so on.

As an example, a user may wish to have certain data displayed in a standard web page format. The standard page format may have a standard template for a banner, and a standard template for a sidebar. This user preference, as well as the banner template and the sidebar template, would be stored in the ODB and would be used by the application to present retrieved data in the desired format.

Data may also be published in different forms simultaneously and on the fly. Agent data may get published by being incorporated into and sent in an e-mail. At the same time, the data may appear in an application window on the computer display screen. The template specifying how the data is to be displayed or published as well as the data itself are stored in the ODB.

By storing all data in a canonical form, agents and all other components of the application can be used to operate on retrieved data regardless of the original location or type of resource from which it was retrieved.

A primary benefit to the agent 100 is that multiple agents 100 can be used to quickly retrieve target content from many different remote sources, all of which can then be displayed in a single application window page.

The retrieved target content is stored on the local user's computer 110 in a format which is known to the software agent application 100. The retrieved target content is data which is stored on the user's computer 110 in a standard format and can be accessed repeatedly by a display program. The data includes the content text and HTML formatting information.

One or more predefined display structures, called publication templates, can be used to arrange the stored target content into personal web pages having different formats, such as a newspaper, web portal, etc. The publication templates are programmed with instructions for accessing particular parts of the stored target content and displaying it in a user application window, such as a browser window.

As an example, five agents are programmed to retrieve content consisting of the current news headlines and opening paragraphs of each story from five magazines and newspapers available on remote internet web sites. A scheduling application activates the agents every hour. Each of the five agents executes its programmed instructions and retrieves, formats and stores the target content from each of the five news sources on the user's computer 110. After the target content is stored, the user selects a publication template which will display only the headlines from each news publication in its own section on a page in three columns. The associated first paragraph of the story, which is part of the retrieved target content but is not desired will not be displayed using the selected publication template. The template specifies where the content from each publication will begin and which components of the target content text will be displayed. The template may also display information such as the URL where the content was retrieved from, at what time (to show how up to date it is) and the content provider name.

Thus, used in combination in a single software application, the agent 100 and the publication template provide means for retrieving changing target content and displaying the target content in a succinct, useful manner. Such a software application can permit a user to retrieve only desired information from a target web page and screen undesirable content which is of no interest to the user. The application operates faster since it executes on the local user's computer, and only requires an internet connection to retrieve the target content. Once the target content is retrieved, all operations can occur entirely on the user's computer, with no internet interaction being necessary.

The agent enables content generation functions which permit generation of stored output in any standard text-based format presently known. The agent may include gateway interfaces which permit communication using standard network protocols with a wide variety of network services, such as e-mail, HTTP, FTP, etc. The agent may also include translation data and services for converting between disparate types of formats, such as XML, HTML, and WML/WAP).

The agent software (i.e., software incorporated in or operating on the agent) is executed at the application level of any operating system. The agent software is a peer application to a web browser and any other user-accessible applications, such as word processors, spreadsheets, or games. It has the ability to act as an intermediary for the web browser software, allowing the browser to communicate with the agent software and the agent software to act as a proxy on behalf of the browser for subsequent downstream http requests to remote URLs. The agent software also acts as a server of web content to the browser on the local computer 110. The agent software may be implemented entirely on the local computer 110.

The operation of the invention will now be described in the context of several specific applications. One of ordinary skill in the art will readily appreciate that the principles of the invention can be embodied in other applications as well. The following examples should therefore be regarded as illustrative rather than limiting.

Figure 10:
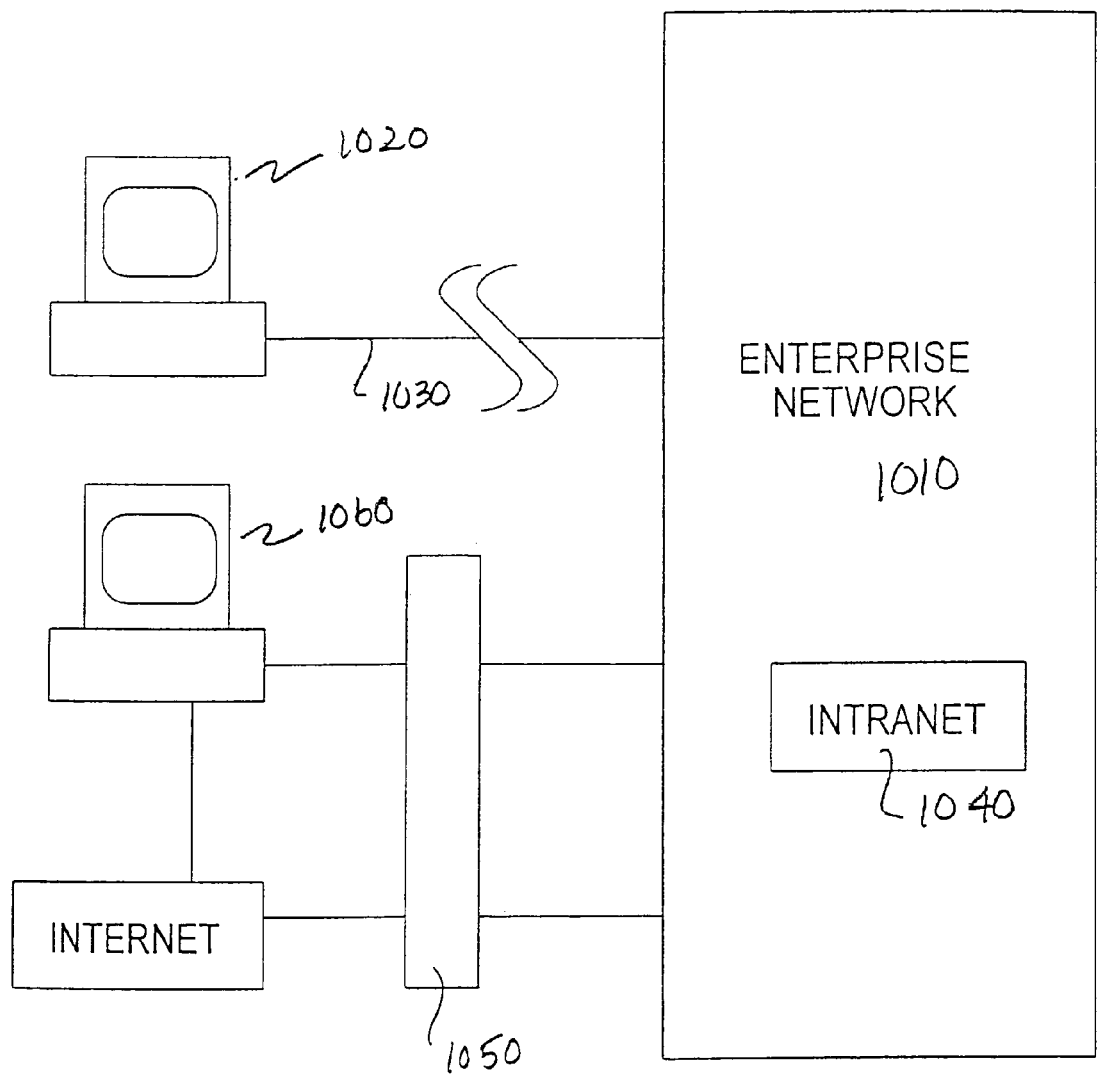
FIG. 10 is a diagram of a system according to the invention in an enterprise server application.

FIG. 10 shows an implementation of a presently preferred embodiment of a system according to the present invention in an enterprise environment. An enterprise network 1010 connects to an individual personal computer 1020 on the network 1010 through a network connection 1030. The enterprise network 1010 also connects to various intranet resources 1040 such as enterprise sales data, financial data, directories, and the like. The enterprise network 1010 also connects to the internet through a firewall 1050.

The personal computer 1020 adapted to operate in accordance with the invention can retrieve data through the enterprise network 1010 from resources on the internet, from intranet resources, and from resources on the personal computer itself. Thus, the user of the personal computer can have access to a display which will simultaneously present information from disparate sources.

It is also useful to implement a method according to present invention on the personal computer 1060 of a customer or client. The personal computer 1060 of the customer or client can be adapted to use agents to gather information directly from the internet or from intranet resources which the enterprise makes available to that customer or client. The enterprise can supply the agents to the customer or client and can also supply a "skin" which will give a unique look and feel to the display. In this manner, the enterprise can make it appear as though the customer or client is accessing the network through a portal designed specifically for them when in fact the screens are generated and the data retrieved by software resident in the personal-computer of the customer or client.

Figure 11:
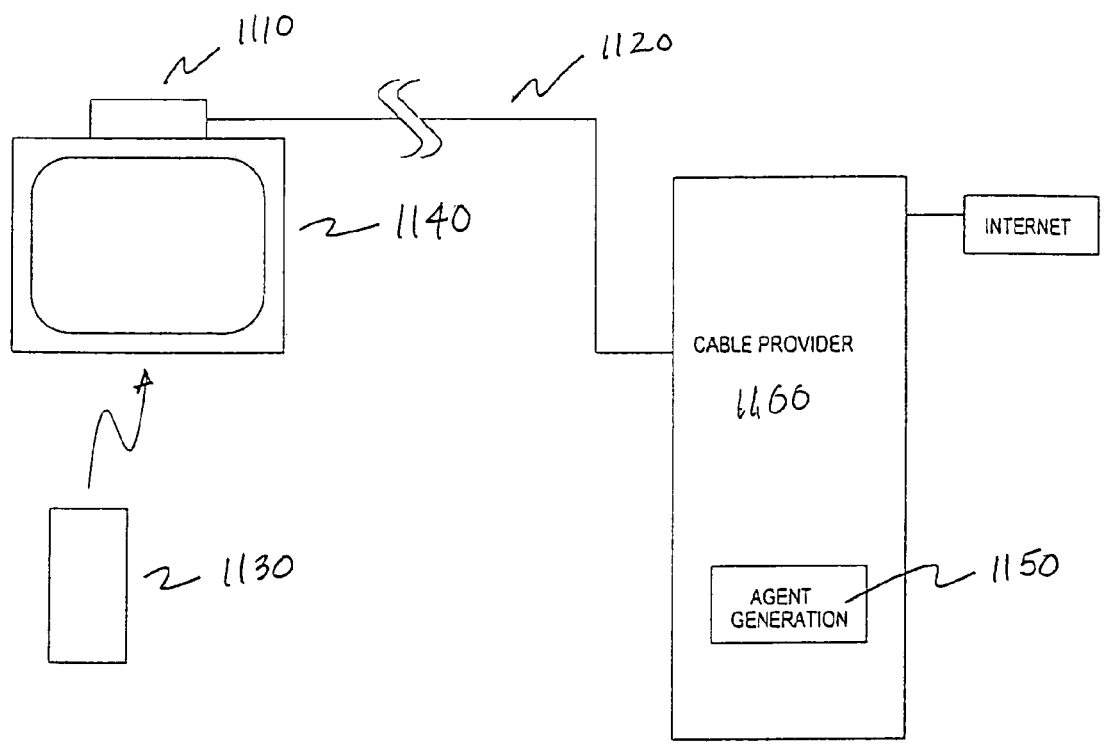
FIG. 11 is a diagram of a system according to the invention in a cable television application.

FIG. 11 shows implementation of a presently preferred embodiment of system according to the present invention in the context of a set top box in a cable TV system. Although FIG. 11 shows a cable TV system, one of ordinary skill of the art will readily appreciate that the principles of the invention can be applied to other centralized programming distribution systems such as satellite or direct broadcast television. In the system shown in FIG. 11, a cable provider 1100 supplies video and computer data to a set-top box 1110 through a cable system 1120. In addition to providing television programming to its customers, the cable provider 1100 also provides access to the internet. Ordinarily a user would use a remote control 1130 to access various resources on the internet with graphical displays of the retrieved data appearing on the television set 1140. In the system shown in FIG. 11, the set-top box 1110 has been provided with capabilities according to the invention to execute agents to retrieve specific data from the internet and to display that data in a predefined format on the television set 1140.

From the standpoint of the cable provider 1100, it may be advantageous to generate agents centrally (1150) and to distribute those agents to the set-top boxes 1110 through the cable system 1120. In this way, cable providers can exercise some degree of control over how the customers access the internet. The cable provider can charge a fee to internet resources which wish to be made preferentially available to the cable provider's customers. Also, given limitations on the ability of the standard TV display computer data, the system according to the invention also provides the advantage that data originally in any one of several possible formats can be re-formatted on-the-fly to a format best suited for display on a television screen.

In fact, the cable service provider 1100 may wish to have data gathering and storage done by a centralized resource and then have only data presentation performed in a localized, distributed fashion. It is one advantage of a system according to the invention that the functions of agent generation/gathering/storage/formatting for display can all be carried out locally, or split and distributed if a certain application makes it desirable to do so.

Figure 12:
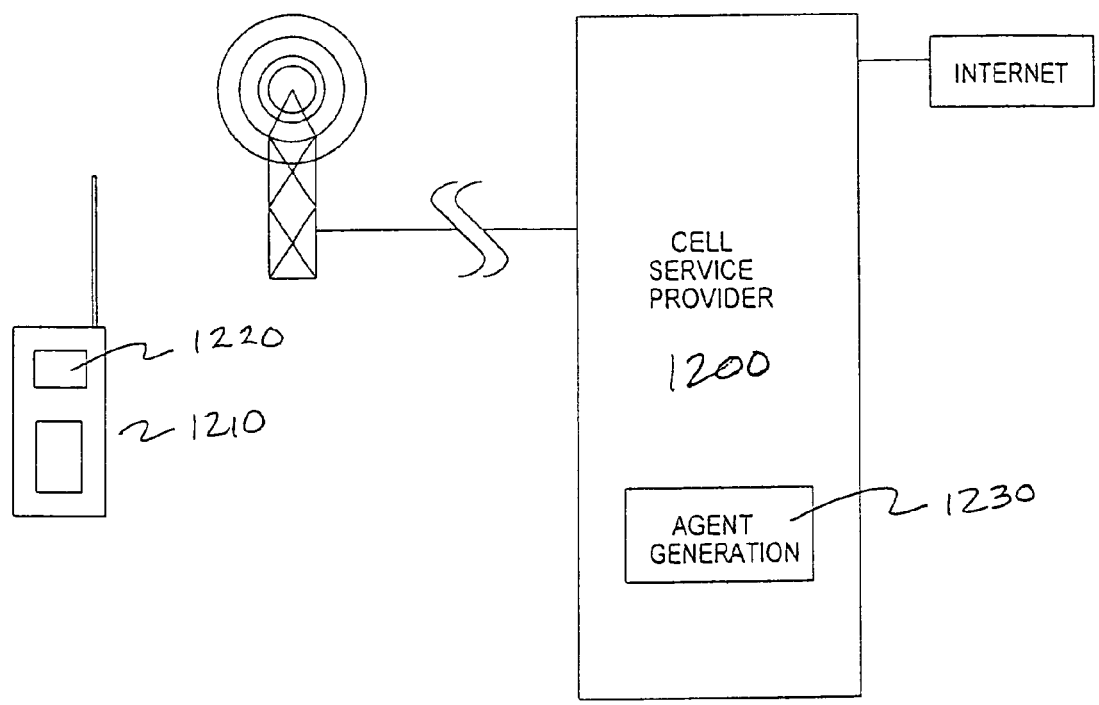
FIG. 12 is a diagram of a system according to the invention in a cellular telephone application.

FIG. 12 shows implementation of the presently preferred embodiment of a system according to the present invention in the context of a cellular telephone system using a WAP enabled cell phone. In the system shown in FIG. 12, a cell service provider 1200 provides access to the internet. Ordinarily a user of the cellular communications device 1210 (which may be a cellular telephone or a personal digital assistant (PDA) equipped with a communications device such as a cellular modem) would access resources on the internet using the device's input controls. In the system shown in FIG. 12, however, the cellular communications device 1210 has embedded capabilities according to the invention to execute agents to retrieve specific data from the internet and display that data in a predefined format on the display 1220. As in the application to a cable system, it may be advantageous for the central service provider, in this case of the cell service provider 1200, to generate agents centrally (1230) and distribute those agents to the cellular communications device 1210 over the airwaves or during an initial programming session. The cell service provider 1200 can charge a fee to internet resources wishing to be made preferentially available to be cell service provider's customers. Also analogously to the cable example, there are severe limitations on the ability of a standard cell phone display or PDA to display computer data. The system according to the invention provides the advantage that data originally in any one of several possible formats, some of which would be incompatible with display on a cell phone display, can be re-formatted on-the-fly to a format better suited for display on the cell phone or PDA.

Thus, the cellular telephony environment is also an example of one in which it may be advantageous to distribute the collection/storage/gathering functions. Although the system makes it possible for all of these functions to be carried out locally and in a de-centralized fashion, in the cellular telephony setting the service provider may wish to have the gathering and storage functions performed at the level of the central service provider with only the display function being performed at the local user level.

Figure 13:
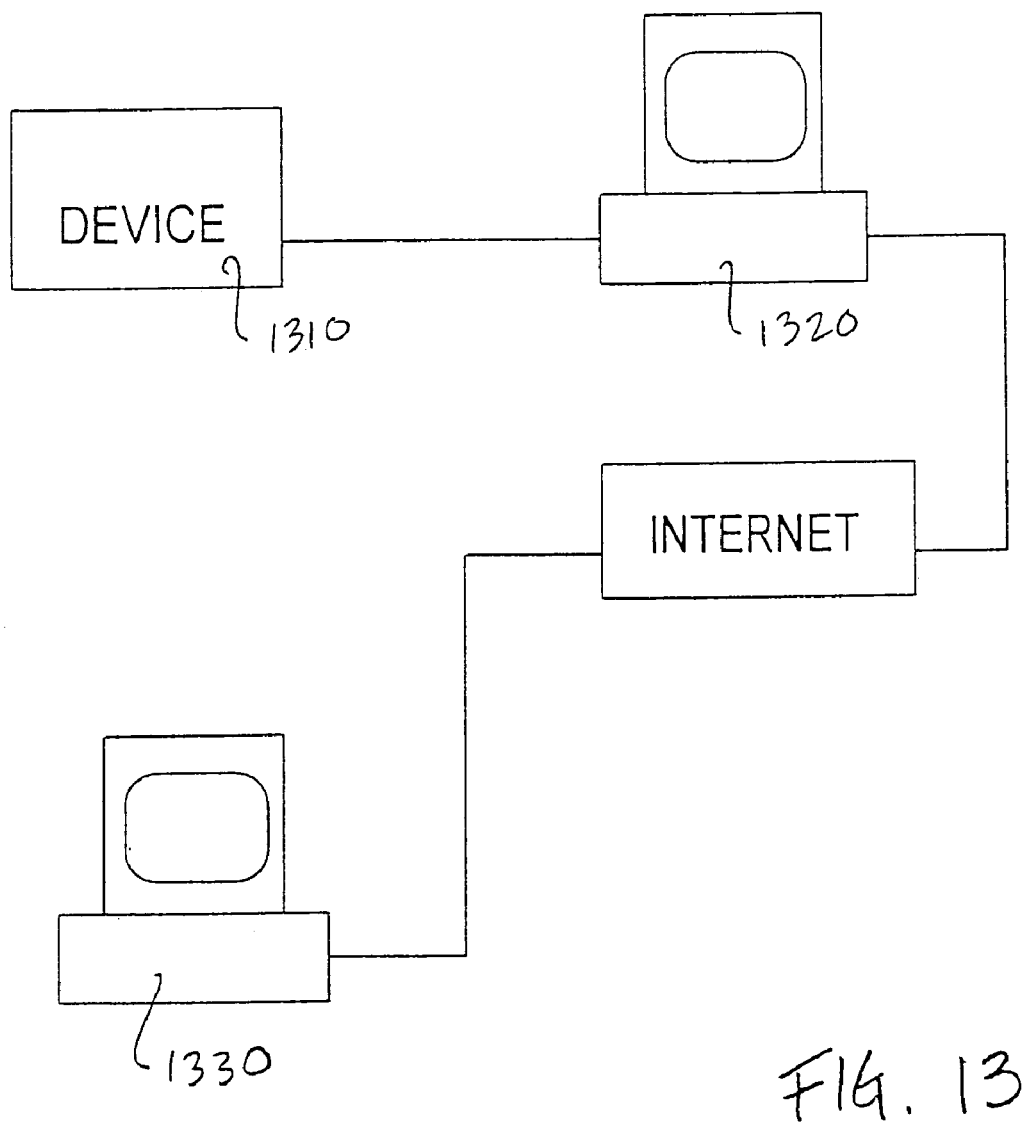
FIG. 13 is a diagram of a system according to the invention in a "smart home" or home gateway application.

As shown in FIG. 13, the owner of a home or other facility may have a device 1310 such as a light, thermostat, door lock, alarm system, etc. which interfaces with a computer 1320, for example, in a "smart home" or "home gateway" setting. The device 1310 may supply data signals to the computer 1320 indicating the current state of the device (e.g., "off", "on") and the computer 1320 may send control signals to the device 1310 to cause the device 1310 to change its state. In this setting, the computer 1320 also preferably has the capability of publishing the various device states to a web page accessible on the internet. For example, the web page could take the form of a floor plan for the house, with data indicating current states appearing on the floor plan at locations corresponding to the respective device's actual physical location in the home. A second computing device, which may be a PC, PDA, cable set top box, web-enabled telephone, etc., can access the web page data containing the data and provide a remote user with information on the status of devices in the home. The user can even control devices by entering information in designated fields on the web page. The web page may even include video data from a security camera or "nanny cam".

Thus, because a system according to the present invention preferably includes a persistent engine which runs constantly, an agent can be configured which will gather information on a device state or so forth. The system can even cause a response to a given input. For example, an event can be caused to take place (a light turned on, a door unlocked) in response to content on a pre-designated web page changing.

While specific embodiments of the invention has been shown and described in detail to illustrate the application of the principles of the invention, it will be understood that the invention may be embodied otherwise without departing from such principles.

What is claimed is:

1. Apparatus comprising:
   retrieval means for retrieving a first set of data from a first predetermined data source, said first set of data including a second set of data;
   analyzing means for analyzing semantics, syntax, or position of said second set of data within said first set of data, said analyzing means comprising:
      first identifying means for identifying a first candidate for selection as said second set of data using a first method;
      second identifying means for identifying a second candidate for selection as said second set of data using a second method different from said first method; third identifying means for identifying a third candidate for selection as said second set of data using a third method different from said second method and said first method; and
      selecting means, responsive to said first, second, and third identifying means, for selecting one of said first, second, and third candidates as said second set of data; and
   means for building an agent, said agent comprising instructions based on said analysis of said semantics, syntax, or position of said second set of data, wherein said instructions are to be used by said agent to subsequently retrieve a third set of data from said first predetermined data source and select a fourth set of data included in said third set of data.

2. Apparatus as claimed in claim 1 wherein said retrieval means, said analyzing means, and said means for building an agent all reside and execute on a single local computer device.

3. Apparatus as claimed in claim 1 further comprising:
   storing means for storing said fourth set of data in a data store in a predetermined storage format, said storing means including means for formatting said fourth set of data in said storage format if the format of the third data set is different from said storage format, and
   means for recalling said fourth set of data from said data store and for formatting said fourth set of data for display on a display device in a presentation format if said presentation format is different from said storage format.

4. Apparatus as claimed in claim 3 wherein said display device is a television monitor and said means for recalling is incorporated into a cable set-top box, said retrieval means, said analyzing means and said storing means all reside and execute on a central computer which exchanges data with said set-top box via a cable connection.

5. Apparatus as claimed in claim 3 wherein said first set of data includes data about a device state from a home gateway system.

6. Apparatus as claimed in claim 5 wherein said retrieval means, said analyzing means, and said storing means all reside and execute on a computer which communicates with said home gate way system over the Internet.

7. Apparatus as claimed in claim 3 wherein said display device is a screen on a web-enabled telephone and wherein said means for recalling is incorporated into said web-enabled telephone.

8. Apparatus as claimed in claim 7 wherein said retrieval means, said analyzing means, and said storing means all reside and execute on a central computer which exchanges data with said web-enabled telephone via a cellular telephone network.

9. Apparatus as claimed in claim 3 wherein said display device is a screen on a PDA.

10. Apparatus as claimed in claim 1 wherein said first predetermined data source includes status information for an external device, and wherein said first set of data includes said status information.

11. Apparatus as claimed in claim 1 wherein said selecting means selects one of said first, second, and third candidates as said second set of data based on a first weighting assigned to said first identifying means, a second weighting assigned to said second identifying means, and a third weighting assigned to said third identifying means.

12. Apparatus as claimed in claim 11 further comprising means, responsive to said selecting means, for altering said first weighting based on a degree of correspondence between said second set of data selected by said selecting means and said first candidate, for altering said second weighting based on a degree of correspondence between said second set of data selected by said selecting means and said second candidate, and for altering said third weighting based on a degree of correspondence between said second set of data selected by said selecting means and said third candidate.

13. Apparatus as claimed in claim 1 wherein said first predetermined data source is a web page.

14. The apparatus of claim 1 wherein said second set of data is similar to said fourth set of data.

15. Apparatus comprising:
retrieval means for retrieving a first set of data from a first predetermined data source and a second set of data from a second predetermined data source, said first set of data and said second set of data each being in any one of several possible formats;
analyzing means for analyzing said first set of data to select, using a first identifying strategy, a second identifying strategy, and a third identifying strategy, a first subset of data included in said first set of data based on a prior analysis of semantics, syntax, or position of said first subset of data included in a previous version of said first set of data, and for analyzing said second set of data to select, using the first identifying strategy, the second identifying strategy, and the third identifying strategy, a second subset of data included in said second set of data based on a prior analysis of semantics, syntax, or position of said second subset of data in a previous version of said second set of data; and
means for displaying said first subset of data and said second subset of data on a display device, said means for displaying including means for reformatting said first subset of data and said second subset of data if necessary for display on said display device.

16. Apparatus as claimed in claim 15, wherein said first predetermined data source is an internet resource.

17. Apparatus as claimed in claim 15 wherein said second predetermined data source is an enterprise intranet resource.

18. Apparatus as claimed in claim 15 wherein said display device is a computer monitor.

19. Apparatus as claimed in claim 15 wherein said display device is a television monitor and wherein said means for displaying is incorporated into a cable set-top box.

20. Apparatus as claimed in claim 15 wherein said display device is a screen on a web-enabled telephone.

21. Apparatus as claimed in claim 15 wherein said display device is a screen on a PDA.

22. Apparatus as claimed in claim 15 further comprising storing means for storing said first subset of data and said second subset of data in a data store in a predefined storage format, said storing means including means for formatting said first subset of data and said second subset of data in said storage format if the format of the first subset of data and said second subset of data is different from said storage format.

23. Apparatus as claimed in claim 15 further comprising a scheduling application for activating said retrieval means at scheduled time intervals.

24. A method comprising the steps of:
retrieving a first set of data from a predetermined data source, said first set of data including a second set of data;
analyzing semantics, syntax, or position of said second set of data within said first set of data;
building an agent, said agent comprising instructions based on said step of analyzing semantics, syntax, or position of said second set of data, wherein said instructions are to be used to subsequently retrieve a third set of data from said first predetermined data source and select a fourth set of data included in said third set of data; and
assigning a first weighting factor to a first strategy for retrieving said third set of data;
assigning a second weighting factor to a second strategy for retrieving said third set of data;
assigning a third weighting factor to a third strategy for retrieving said third set of data;
determining a first candidate for said third set of data using said first strategy, a second candidate using said second strategy, and a third candidate for said third set of data using said third strategy; and
selecting one of said first, second, and third candidates as a result third set of data based on said first, second, and third weighting factors.

25. The method of claim 24, further comprising the step of:
adjusting said first weighting factor based on whether said first candidate matches said result third set of data, said second weighting factor based on whether said second candidate matches said result third set of data, and said third weighting factor based on whether said third candidate matches said result third set of data.

26. The method as claimed in claim 24 further comprising the step of executing said agent to subsequently retrieve said third set of data from said first predetermined data source and select said fourth set of data included in said third set of data.

27. The method of claim 26 further comprising the steps of:
storing said fourth set of data in a data store in a predetermined storage format, formatting said fourth set of data in said storage format if the format of the third data set is different from said storage format, and recalling said fourth set of data from said data store and formatting said fourth set of data for display on a display device in a presentation format if said presentation format is different from said storage format.

28. The method of claim 27 wherein said step of executing said agent is repeated at scheduled time intervals.

* * * * *